United States Patent [19]
Sansonetti

[11] Patent Number: 5,313,538
[45] Date of Patent: May 17, 1994

[54] METHOD OF MAKING AN INDEX GRATING IN AN OPTICAL FIBER, AND A QUASI-DISTRIBUTED ARRAY OF SENSORS FORMED IN SAID FIBER

[75] Inventor: Pierre Sansonetti, Aix en Provence, France

[73] Assignee: Bertin & Cie, Plaisir, France

[21] Appl. No.: 768,533

[22] PCT Filed: Feb. 5, 1991

[86] PCT No.: PCT/FR91/00083
 § 371 Date: Oct. 3, 1991
 § 102(e) Date: Oct. 3, 1991

[87] PCT Pub. No.: WO91/12545
 PCT Pub. Date: Aug. 22, 1991

[30] Foreign Application Priority Data
 Feb. 6, 1990 [FR] France ................. 90 01345

[51] Int. Cl.$^5$ ............................ G02B 6/00; G02B 6/36
[52] U.S. Cl. ........................................................ 385/28
[58] Field of Search .................. 359/558, 563, 571, 572, 359/573; 385/27-29

[56] References Cited

U.S. PATENT DOCUMENTS

| | | | |
|---|---|---|---|
| 4,096,446 | 6/1978 | Haus et al. | 385/28 X |
| 4,974,930 | 12/1990 | Blyer, Jr. et al. | 385/28 |
| 5,104,209 | 4/1992 | Hill et al. | 385/27 |

FOREIGN PATENT DOCUMENTS

| | | |
|---|---|---|
| 1149209 | 7/1983 | Canada . |
| WO8601303 | 2/1986 | PCT Int'l Appl. . |
| 2189901 | 11/1987 | United Kingdom . |

Primary Examiner—Akm E. Ullah
Attorney, Agent, or Firm—Bell, Seltzer, Park & Gibson

[57] ABSTRACT

An array of sensors quasi-distributed in an optical fiber (10), the sensors being delimited along the fiber by intermode coupling zones which are made by exposing the optical fiber (10) to a laser beam (16) through a mask (18) having periodic spatial transmission tuned to the difference between the propagation constants of the two modes to be coupled.

12 Claims, 1 Drawing Sheet

METHOD OF MAKING AN INDEX GRATING IN AN OPTICAL FIBER, AND A QUASI-DISTRIBUTED ARRAY OF SENSORS FORMED IN SAID FIBER

The invention relates to a method of making an index grating in a multimode optical fiber or a fiber in which only a few modes propagate, and also to a quasi-distributed array of sensors formed in said optical fiber.

To achieve coupling between two modes of light propagation in an optical fiber, one known solution consists in creating an index grating along the fiber in the guiding structure thereof with the index grating being periodic and having a spatial period equal to a multiple of $2\pi$ divided by the difference between the propagation constants of the two modes of light propagation.

Until now, index gratings have been created by machining and chemically etching the fiber, with the drawback of weakening the fiber, or else by mechanically compressing the fiber locally, with the drawbacks of poor definition of the intermode coupling points and of making the fiber bulkier and weaker.

A particular aim of the invention is to avoid these drawbacks.

An object of the invention is to provide a method of making an index grating in a two-mode or a multimode optical fiber without weakening the optical fiber and making it possible to delimit the coupling points very accurately.

Another object of the invention is to provide a quasi-distributed array of sensors in an optical fiber by performing the method.

SUMMARY OF THE INVENTION

The present invention thus provides a method of making an index grating in a multimode optical fiber, the method being characterized in that it consists in exposing the optical fiber to a laser beam through a mask which has periodic transmission and which is applied against the optical fiber.

The exposure of the fiber to the laser beam causes the refractive index in the fiber core to vary, particularly when the core is doped with germanium.

Exposure through a mask having periodic transmission makes it very simple to obtain the desired index grating in the fiber.

Preferably, the laser beam is directed perpendicularly to the axis of the fiber.

In the mask, it is possible to superpose two different longitudinal transmission periods, thereby making it possible to achieve simultaneous coupling within the fiber, e.g. between two modes of polarization and two transverse modes of light guidance within the optical fiber, or between two transverse modes in two polarizations.

The optical fiber is exposed to the laser beam through the mask at regular intervals along the fiber, which intervals may be about 10 cm, for example.

The optical fiber then constitutes an array of sensors.

The invention also provides a quasi-distributed array of sensors in an optical fiber, the array being characterized in that the sensors are defined by segments of the optical fiber delimited by periodic index grating zones for intermode coupling formed in the optical fiber by performing the above method.

A first end of the optical fiber is connected via a polarizer to a light source such as a super light emitting diode which injects light into the optical fiber in a single propagation mode, and the second end of the fiber is connected to a demultiplexing system.

This system includes means for tuning to the different optical path lengths generated by the sensors, thus achieving coherence demultiplexing.

In a variant, the optical fiber may be connected to as many multiplexing systems as there are sensors, with each system being tuned to the optical path length difference that corresponds to a particular sensor.

Such sensors can be used for measuring physical magnitudes such as temperature, deformation, pressure, magnetic field, etc. . . . , acting on the segments of fiber that constitute the sensors.

In particular, such sensors can be used on structures, e.g. to measure the stresses in components of a structure and to keep variations of such stresses under surveillance.

BRIEF DESCRIPTION OF THE DRAWINGS

The invention will be better understood and other characteristics, details, and advantages thereof will appear more clearly on reading the following description given by way of example and made with reference to the accompanying drawing, in which.

DESCRIPTION OF ILLUSTRATED EMBODIMENTS

Figure 1:
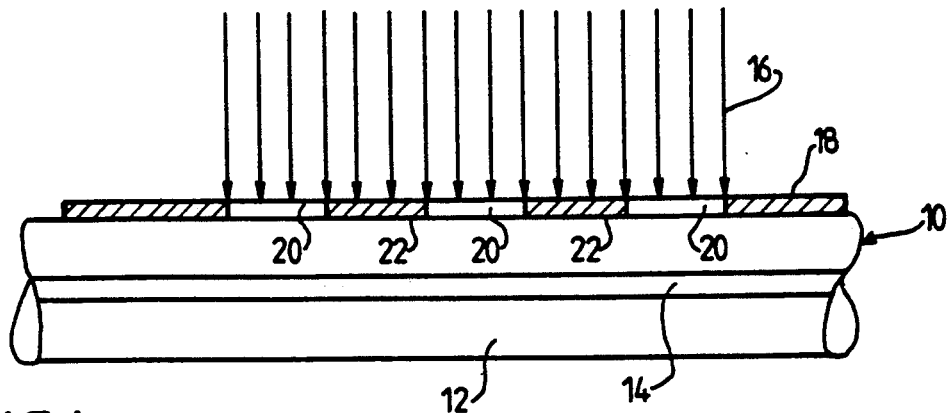
FIG. 1 is a diagram showing the method of the invention.

With reference initially to FIG. 1, reference 10 designates a multimode optical fiber or in which a few modes propagate, the fiber comprising cladding 12 and a core 14, e.g. made of germanium-doped silica. To form an index grating with periodic spatial distribution in the core of the optical fiber, the invention provides for exposing the fiber to a laser beam 16 of appropriate dimensions through a mask 18 applied to the outside of the fiber, with the laser beam 16 being directed perpendicularly to the axis of the fiber.

For example, it is possible to use a continuous argon laser having a power of about 50 mW, and emitting at a wavelength of 514 nm. Exposure time is about 30 minutes. It is also possible to emit over a spectrum band centered on 240 nm.

The mask 18 has longitudinally periodic transmission with openings 20 separated from one another by solid portions 22, and with the distribution of these solid portions and openings being periodic, the spatial period $\Lambda$ given by the following equation:

$$\Lambda = p \cdot 2\pi / \Delta\beta$$

where p is an integer, and $\Delta\beta$ is the difference between the propagation constants of the two modes to be coupled together in the fiber ($\Delta\beta$ being related to the effective refractive index difference $\Delta n$ for the two modes by the equation $\lambda \cdot \Delta\beta = 2\pi \cdot \Delta n$).

Exposing the optical fiber through the openings 20 in the mask gives rise to variations in the refractive index in the core 14 of the fiber, and when such index variations are periodic having a spatial period $\Lambda$ defined by the above equation, they provide coupling between two modes of light propagation whose propagation constants satisfy the above equation.

The two polarization modes of a birefringent fiber can be coupled together in this way (with the elementary period $2\pi/\Delta\beta$ being of the order of one millimeter).

It is also possible to couple together two transverse guidance modes (e.g. $LP_{01}$ and $LP_{11}$), in which case the elementary period $2\pi/\Delta\beta$ is of the order of half a millimeter.

It is also possible to couple together polarization modes and transverse modes simultaneously if the two corresponding spatial periods are superposed in the mask 18.

In addition, all types of mode may be coupled providing the period is adjusted appropriately.

By displacing the optical fiber 10 longitudinally relative to the mask 18 and to the laser beam 16, it is possible to make various different index grating zones in the optical fiber, thus forming intermode coupling points that are regularly spaced apart from one another and that are separated by intervals that may be of the order of 10 cm, for example, with the length of any one coupling zone being a few millimeters.

Figure 2:
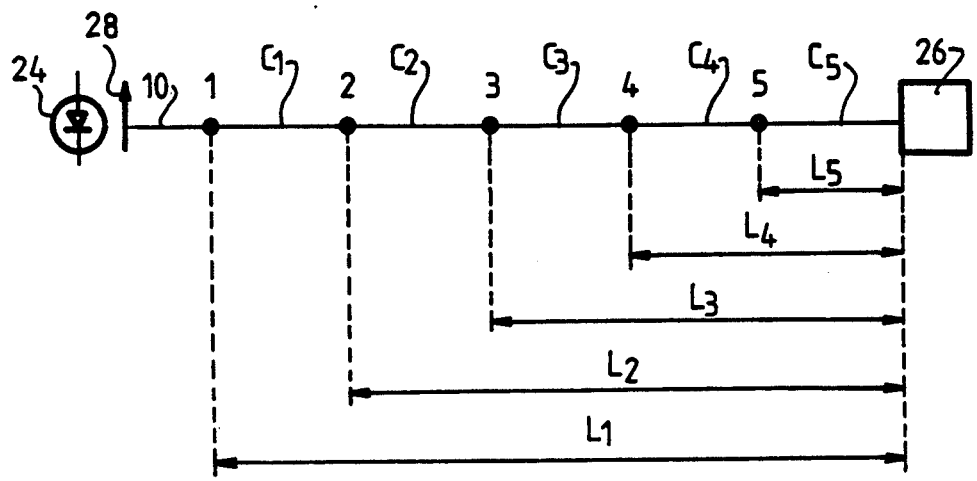
FIG. 2 is a diagram showing how an array of sensors of the invention can be used.

It is thus possible to obtain an optical fiber 10 having a plurality of coupling points designated in FIG. 2 by references 1, 2, 3, 4, 5, . . . , and defining between one another segments of fiber which constitute sensors C1, C2, C3, C4, C5, . . . .

One end of the optical fiber 10 may be connected to a light source 24 such as a super light emitting diode by means of a polarizer 28 aligned on one of the neutral axes, and the other end of the fiber may be connected to a demultiplexing system 26 suitable for being tuned successively to each of the various optical path length differences that correspond to the lengths of fiber L1, L2, L3, L4, L5, . . . between each of the points 1, 2, 3, 4, 5, . . . , and the outlet of the fiber.

Information relating to each sensor C1, C2, C3, C4, C5, . . . , is obtained by successive subtraction.

In a variant, it would naturally be possible to use the same number of demultiplexing systems as there are lengths Li, with each system being tuned to the optical path length difference that corresponds to a particular length Li.

If light is injected at the inlet of the optical fiber 10 in a single mode, while the fiber is capable of having two modes propagating therein, then the first coupling point 1 diverts a fraction of the light flux into the other mode, and at the outlet from the fiber 10 an interference signal is obtained whose phase is given by:

$$\Delta\phi_1 = \Delta\beta.L_1$$

where $L_1$ is the length of the fiber from the point 1 to the outlet of the fiber, and $\Delta\beta$ is the difference between the propagation constants of the two modes.

Similarly, the second coupling point provides coupling between the two light propagation modes, and this gives rise to an interference signal being obtained at the outlet of the fiber 10 with phase given by:

$$\Delta\phi_2 = \Delta\beta.L_2$$

and so on for the other coupling points.

These phase differences obtained at the outlet from the fiber 10 make it possible to determine the light propagation characteristics in the lengths of fiber L1, L2, L3, L4, L5, . . . . By taking differences, it is then possible to obtain the light propagation characteristics between the coupling points, i.e. for each sensor C1, C2, C3, C4, C5, . . . . Prior calibration makes it possible to obtain values of physical magnitudes such as temperature, deformation, pressure, magnetic field, etc. acting on the sensors and modifying the light propagation characteristics in the corresponding segments of fiber.

The system 26 serves to demultiplex the signals produced by the various sensors when the optical path length differences corresponding to the intervals between the coupling points are greater than the coherence length of the light source 24, since demultiplexing is based on phase differences $-\Delta\phi_i$ being created each corresponding to a length $L_i$. This can be achieved by a phase shifter having a path length difference that varies between the two modes, with the assembly forming a single interferometer. For coupling together two polarization modes, a polarizer at 45° to the neutral axes is placed at the outlet of the demultiplexing system 26 and forms a part of the assembly comprising the sensors and the demultiplexer. For coupling between two transverse modes, a spatial filter is used.

If $\Delta n$ is of the order of $10^{-3}$, and if the coherent length of the light source is of the order of 50 microns, the distance between coupling points must be greater than 10 cm, and the distance between the last coupling point and the outlet from the optical fiber should be at least of the same order.

Figure 3:
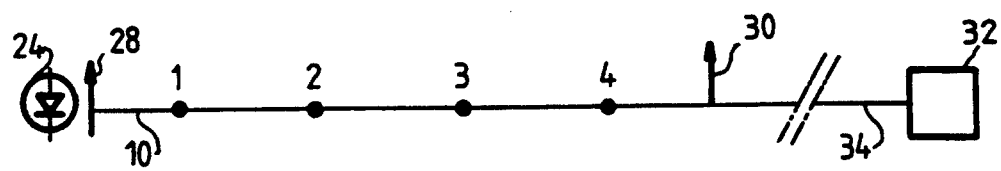
FIG. 3 is a diagram showing a variant use of such an array of sensors.

FIG. 3 shows a variant in which, unlike the embodiment of FIG. 2 where the assembly comprising the sensors and the receiver constitutes one interferometer only, the array of sensors and a polarizer 30 at 45° to the neutral axes of the optical fiber 10 form an interferometer that provides spectrum encoding of the light source 24. Any type of interferometer 32 that is tunable on the desired optical path length differences and that is connected to the polarizer 30 by another fiber 34 can be used to demodulate the spectrum encoding of the source 24.

In particular, this system is not sensitive to the length of the link between the array of sensors and the interferometer 32.

I claim:

1. A method of making an index grating in the core of a multimode optical fiber, the method comprising the steps of applying a mask against the optical fiber, the mask having a spatial periodic transmission, and irradiating the optical fiber through the mask by a laser beam.

2. A method according to claim 1, wherein the laser beam is directed perpendicularly to the axis of the fiber.

3. A method according to claim 1, wherein the mask has a spatial period of transmission equal to a multiple of $2\pi$ divided by the difference between the propagation constants of two modes of light propagation to be coupled in the fiber.

4. A method according to claim 1, wherein the mask has two different spatial periods of transmission superposed therein for simultaneous coupling between two polarization modes and two transverse modes of light guidance in the optical fiber, or between two transverse modes in two polarizations.

5. A method according to claim 1, comprising the further step of repeating the exposure of the optical fiber to the laser beam through the mask at regular intervals along the optical fiber.

6. A method according to claim 1, wherein the optical fiber is made of germanium-doped silica.

7. A quasi-distributed array of sensors in an optical fiber, wherein the sensors are defined by segments of the optical fiber which are delimited by periodic index grating zones for intermode coupling in the core of the optical fiber, said index grating zones being formed by applying a mask having a spatial periodic transmission against the optical fiber and by irradiating the optical fiber through the mask by a laser beam.

8. An array according to claim 7, wherein a first end of the optical fiber is connected via a polarizer to a light source for injecting light into the optical fiber in a single propagation mode, and the second end of the fiber is connected to a system for demultiplexing by coherence.

9. An array according to claim 7, wherein the optical path length differences in the intervals between pairs of intermode coupling zones are greater than the coherence length of the light source.

10. An array according to claim 8, wherein the demultiplexing system comprises means for tuning over the optical path length differences in the fiber between the various intermode coupling zones.

11. An array according to claim 8, wherein the demultiplexing system comprises a plurality of systems each tuned to a single optical path length difference in the fiber between a pair of intermode coupling zones.

12. An array according to claim 8, comprising a polarizer directed at 45° to the neutral axes of the optical fiber, and constituting an interferometer for encoding the spectrum emitted by the light source, this interferometer being connected to a demodulating interferometer of arbitrary type.

* * * * *